Feb. 23, 1965 E. J. SCHNEIDER 3,170,981
OPTICAL APPARATUS FOR DETERMINING THE AXIAL ALIGNMENT OF A BORE
Filed May 2, 1960 4 Sheets-Sheet 1
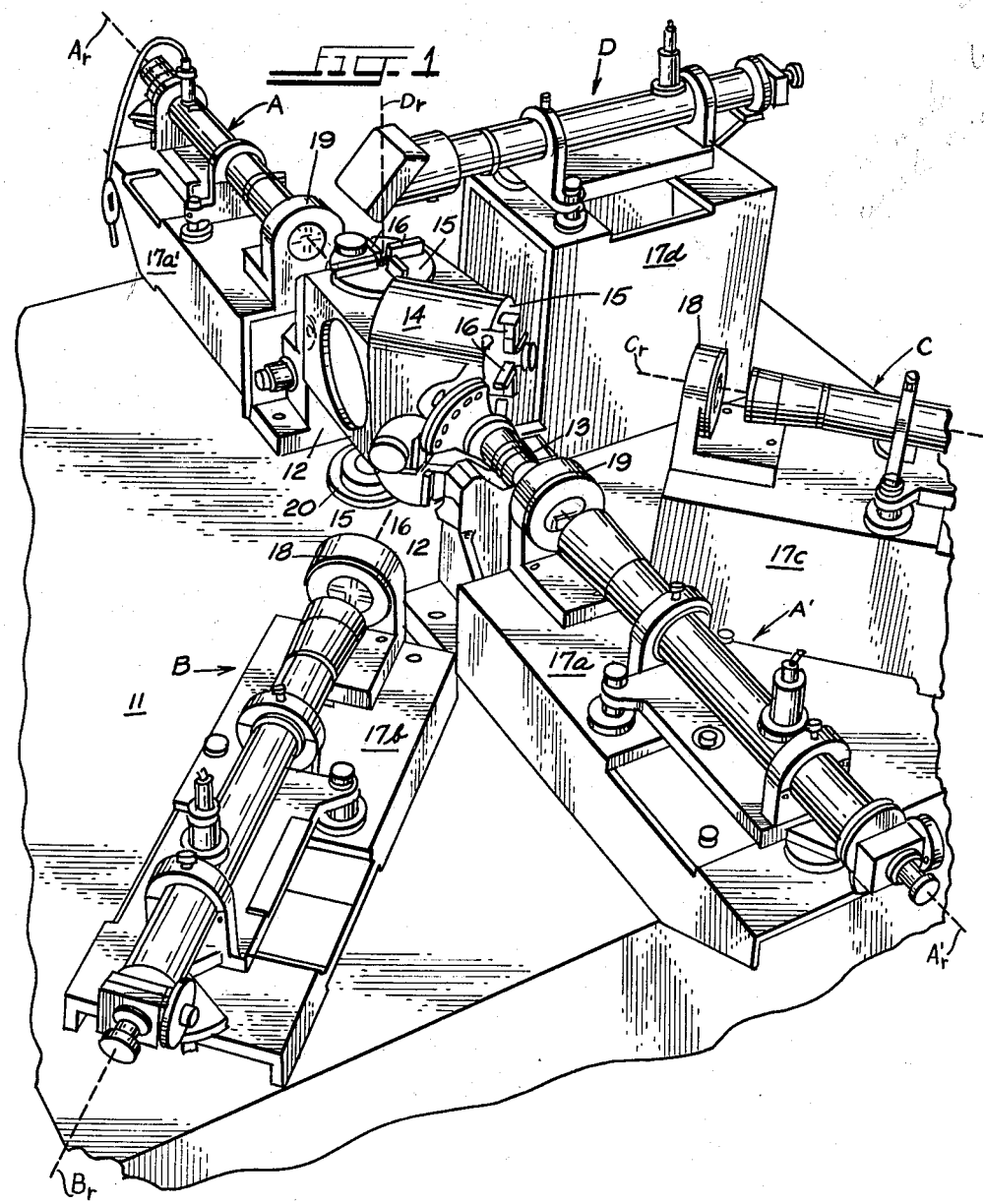
INVENTOR.
Eric J. Schneider
BY
Kegan, Bellamy & Kegan
ATTYS.

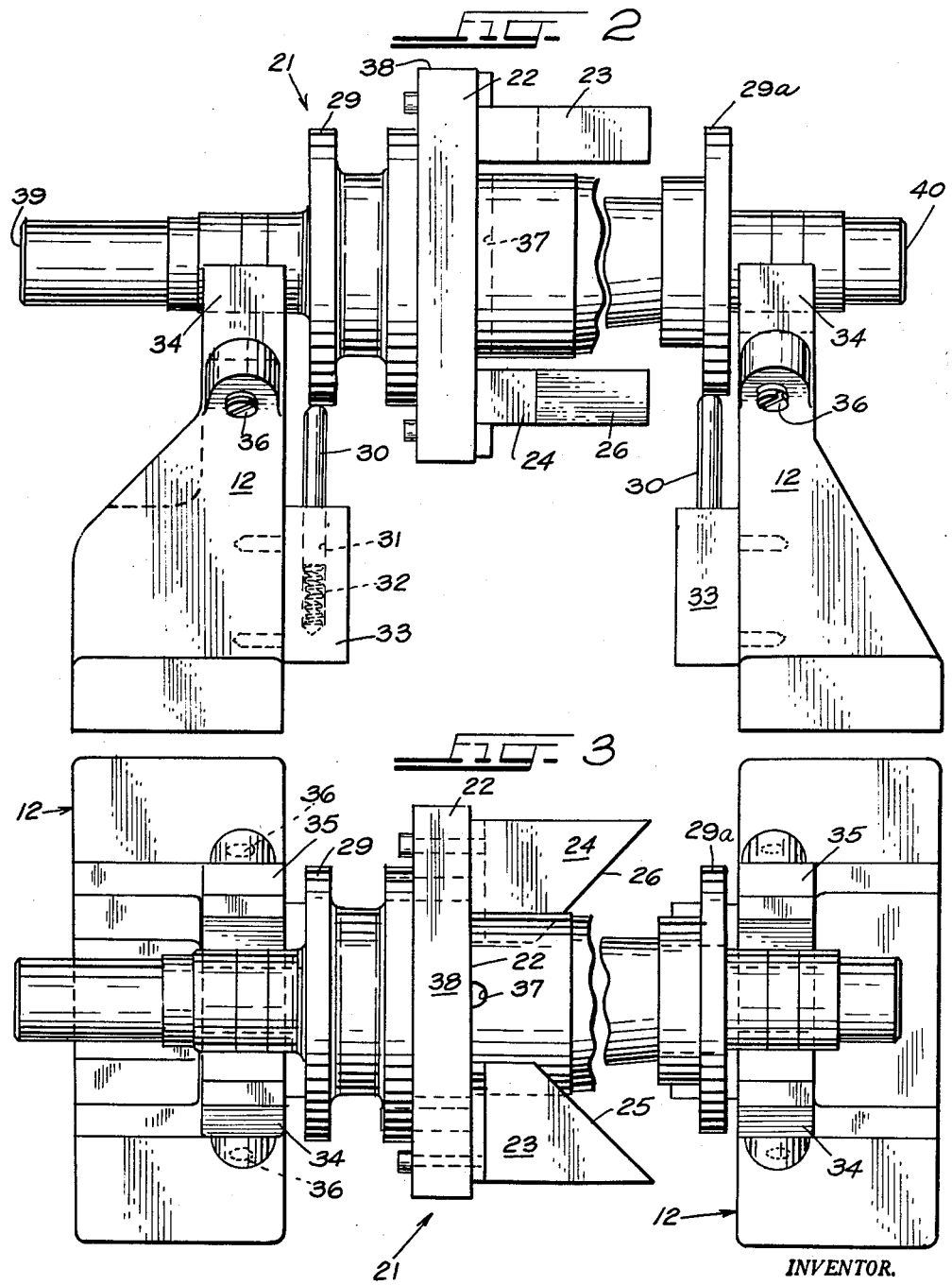

Feb. 23, 1965 E. J. SCHNEIDER 3,170,981
OPTICAL APPARATUS FOR DETERMINING THE AXIAL ALIGNMENT OF A BORE
Filed May 2, 1960 4 Sheets-Sheet 3
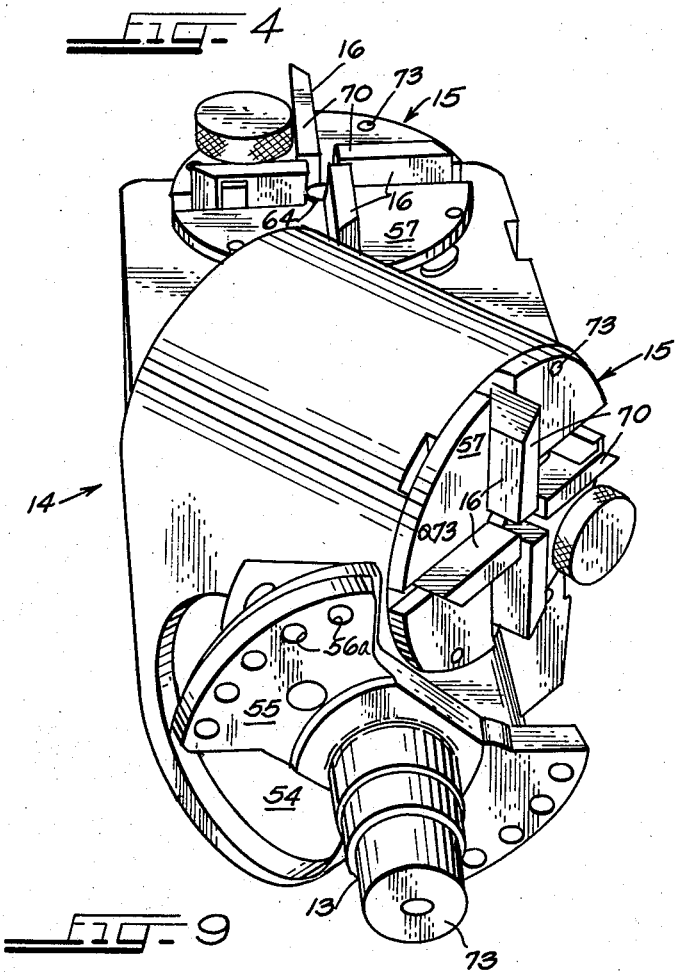
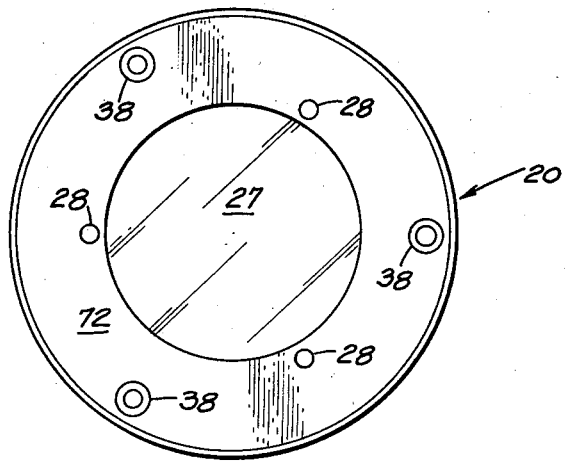
INVENTOR.
Eric J. Schneider
BY
Kegan, Bellamy & Kegan
Attys.

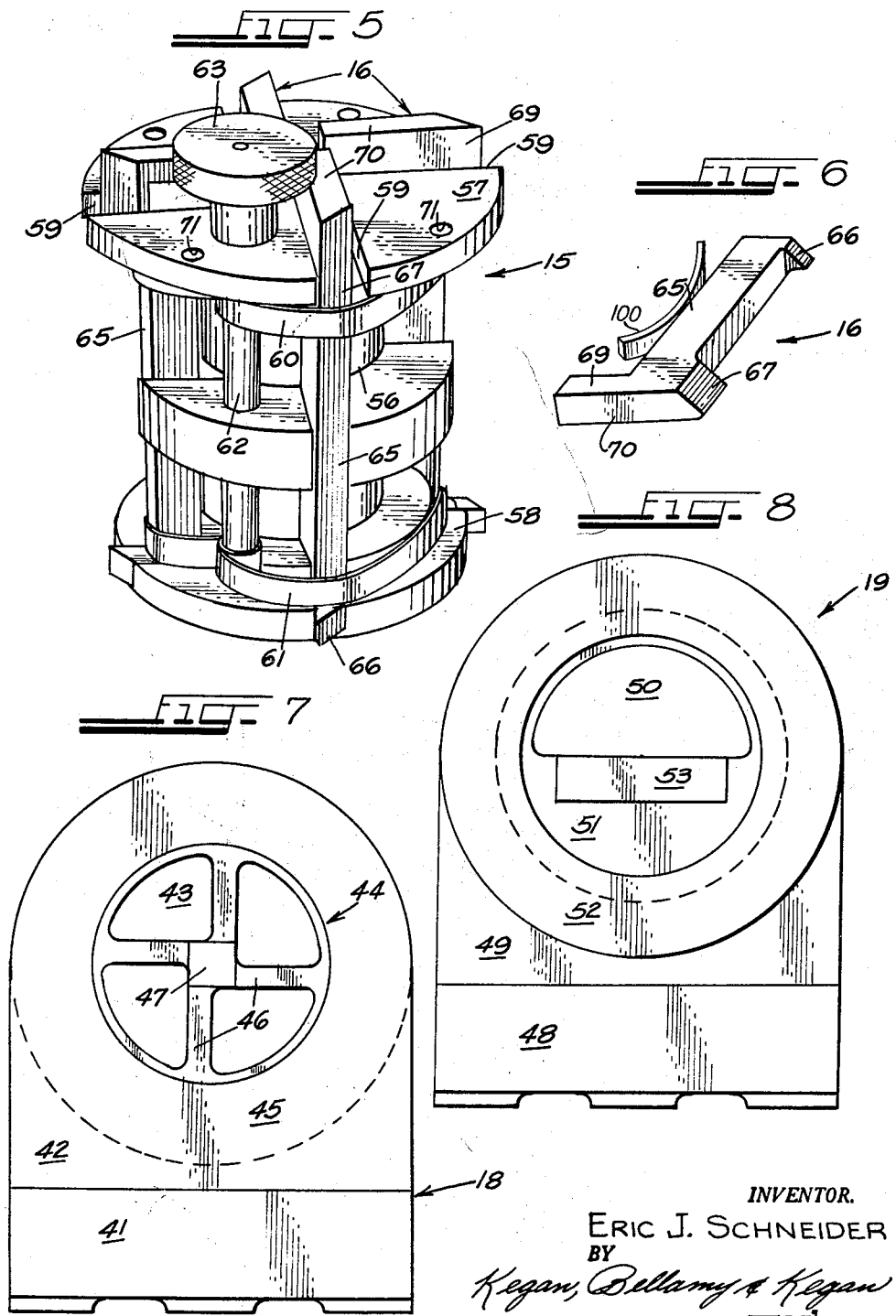

United States Patent Office 3,170,981
Patented Feb. 23, 1965

3,170,981
OPTICAL APPARATUS FOR DETERMINING THE AXIAL ALIGNMENT OF A BORE
Eric J. Schneider, Chicago, Ill., assignor to Engis Equipment Company, Chicago, Ill., a corporation of Illinois
Filed May 2, 1960, Ser. No. 25,938
10 Claims. (Cl. 88—14)

The present invention relates generally to optical apparatus and more particularly to an optical apparatus for determining the alignment of the axis of a bore in a workpiece relative to a predetermined reference axis.

The apparatus for making this determination includes a collimator tube having cross hairs therein, a light source behind the cross hairs, and a lens arrangement for projecting parallel rays of light at the bore in the workpiece. The apparatus further includes a reference mirror having a reflecting surface disposed centrally in the beam of parallel light rays and perpendicularly to the desired reference axis. Within the bore itself there are arranged a plurality of blade mirrors, each extending longitudinally through the bore and each having a reflecting surface extending radially between the axis of the bore and the inner wall surface thereof.

Assuming the bore is cylindrical, the blade mirrors will extend longitudinally parallel to the bore axis and their reflecting surfaces will lie in a plane perpendicular to the axis of the bore. To determine the axial alignment of this bore the cross hair image reflected by the reference mirror is viewed through the collimator tube and compared with the cross hair image reflected by any one of the blade mirrors in the bore. If the two images merge this means that the reflecting surface of each mirror is perpendicular to the same axis thereby indicating that the axis of the bore is properly aligned with the reference axis. If the two images do not merge, the relative deviation is an indication of the extent to which the bore axis is misaligned.

For convenience purposes the subject apparatus is arranged so that the reference axis is horizontal and includes means for mounting the workpiece in a predetermined position in which the bore axis will be aligned with the horizontal reference axis if the bore has been properly formed.

If the bore is tapered rather than cylindrical, the blade mirrors will not extend parallel to the bore axis but will converge and the reflecting surfaces of the blade mirrors will not be perpendicular to the bore axis nor co-planar with each other but will be mutually inclined. To determine the axial alignment of a bore in this situation, the blade mirrors are mounted within the bore so that when the workpiece is mounted in its predetermined position the respective radial directions in which each blade mirror reflecting surface extends corresponds to the direction of a respective cross hair. In other words, if there is one horizontal cross hair and one vertical cross hair, then there will be a pair of horizontally disposed blade mirrors each extending in an opposite horizontal direction from the bore axis and a pair of vertically disposed blade mirrors correspondingly positioned.

The image of the cross hairs reflected from the reference mirror is then compared with the images from the blade mirrors located in the tapered bore. Since the reflecting surfaces of each pair of blade mirrors are inclined in opposite directions, the image from each of the horizontally disposed blade mirrors will be spaced horizontally on respective opposite sides of the reference mirror image and the image from each of the vertically disposed blade mirrors will be spaced vertically on opposite sides of the reference mirror image. If the vertical cross hair image reflected by the reference mirror bisects the distance between the vertical cross hair images from the two horizontally disposed blade mirrors, this is an indication that the axis of the tapered bore lies in the same vertical plane as the horizontal reference axis. If the horizontal cross hair image reflected by the reference mirror bisects the distance between the horizontal cross hair images from the two vertically disposed blade mirrors, this means that the axis of the tapered bore lies in the same horizontal plane as the horizontal reference axis. The extent to which the blade mirror images do not exactly straddle the reference mirror image is an indication of the misalignment of the bore axis. It should be noted that directions of reference other than horizontal or vertical may be used with the subject apparatus, and that these directions have been used merely for convenience and ease of description.

It is, therefore, a primary object of the present invention to provide an optical apparatus for determining the alignment of the axis of a bore in a workpiece relative to a predetermined reference axis.

Another object of the present invention is an apparatus of the type described and which is particularly suited for determining the relative alignment of the axis of a tapered bore.

A further object of the present invention is an apparatus of the type described and which is relatively simple to operate.

Other objects and advantages are inherent in the structure claimed and disclosed as will become apparent to those skilled in the art from the following detailed description in conjunction with the accompanying drawings wherein:

FIG. 1 is a perspective view of a workpiece and of apparatus used to determine the respective axial alignment of bores in the workpiece;

FIG. 2 is an enlarged side elevational view of a master reflecting element used to align the reflecting surface of a reference mirror in a plane perpendicular to a predetermined reference axis;

FIG. 3 is a plan view of the master reflecting element shown in FIG. 2;

FIG. 4 is a perspective view of a workpiece having a plurality of bores, two of which are shown containing bore axis locating units each of which holds a plurality of blade mirrors;

FIG. 5 is a perspective view of the locating unit holding a plurality of blade mirrors;

FIG. 6 is a perspective view of a blade mirror;

FIG. 7 is a front view of one type of reference mirror unit;

FIG. 8 is a front view of another type of reference mirror unit; and

FIG. 9 is a plan view of a third type of reference mirror unit.

Referring to FIG. 1, there is shown a table having a perfectly flat top 11 on which rests a pair of V blocks 12, each supporting a respective stub shaft 13 extending from opposite sides of the workpiece 14. Workpiece 14 has a plurality of bores within each of which is mounted a bore axis locating unit 15 (FIG. 4). Mounted in each locating unit 15 are a plurality of blade mirrors 16 each extending radially between the axis of the bore and the side wall surface thereof.

Also resting on the table top 11 are a plurality of stands 17a, 17a', 17b, 17c and 17d, each supporting a conventional collimator tube or tubular viewing scope A, A', B, C, and D respectively. Each collimator tube has therein a pair of cross hairs, a light source behind the cross hairs, and an arrangement of lenses for projecting a beam of parallel light rays. Collimator tubes A and A' are arranged to direct a beam of light at respective stub shafts 13, while collimator tubes B, C, and D are situated to direct a beam of light at a respective one of the bores of the workpiece.

Located atop stands 17b and 17c and in the path of light rays emanating from tubes B and C are reference mirror units 18. Located atop stands 17a and 17a' and in the path of light rays emanating from tubes A and A' are reference mirror units 19. Resting on table top 11, beneath workpiece 14, is a reference mirror unit 20 lying in the path of light rays emanating from tube D. A portion of the light emanating from each collimator tube will be reflected by the reflecting surface of the blade mirrors 16 in the bore at which the light is directed. Another portion of the light emanating from each collimator tube will be reflected by the reference mirror located centrally in the path of the light rays. The reflecting surface of the reference mirror has been initially aligned so that it is perpendicular to the desired reference axis. A sighting is then taken through a collimator tube and the image reflected from the reference mirror is compared with the images reflected from the blade mirrors in the corresponding bore. The alignment of the bore axis is then determined on the basis of this sighting. The initial alignment of the reference mirrors is as follows.

First the reflecting surface 27 on circular reference mirror unit 20 (FIG. 9) must be aligned perpendicular to reference axis $D_r$, which axis is a vertical and is perpendicular to table top 11 (FIG. 1). The alignment of surface 27 is determined by viewing the image reflected by surface 27 through collimator tube D, then rotating mirror unit 20 one hundred and eighty degrees, again viewing the image reflected by surface 27, and comparing it with the previously viewed images. If the two images fall in the same position in the field of view then the reflecting surface 27 is parallel to table top 11 and hence perpendicular to reference axis $D_r$. If the two images do not fall in the same position this means that reflecting surface 27 is not perpendicular to the reference axis, which condition can be remedied by adjusting Allen screws 28 (FIG. 9) spaced around the periphery of reflecting surface 27 in unit 20. The peripheral screws 38 attach an annular top portion 72 to unit 20.

The alignment of the other reference mirrors is accomplished by using a master reflecting element 21 shown in FIGS. 2 and 3. Element 21 constitutes a shaft having a rectangular collar 22 mounted thereon. Attached to vertically opposite ends of collar 22 are upper and lower reflecting blocks 23, 24 respectively. The opposite end portions of element 21 are mounted in respective V blocks 12 and terminate in reflecting surfaces 39, 40. When element 21 is properly mounted in the V blocks a reflecting surface 25 on upper block 23 (FIG. 3) is perpendicular to reference axis $C_r$ (corresponding to collimator C), a reflecting surface 26 on lower reflecting block 24 is perpendicular to reference axis $B_r$ (corresponding to collimator B) and reflecting surfaces 39, 40 are perpendicular to axis $A_r$ (corresponding to collimator tubes A or A'). For purposes of convenience references axes $A_r$, $B_r$, and $C_r$ have been made horizontal. A reference mirror may then be correctly aligned by placing units 18, 19 in the path of the light rays emanating from the respective collimator tubes and adjusting the position of a reference mirror reflecting surface until the image reflected thereby merges with the image reflected by the corresponding reflecting surface on the reflecting blocks or the shaft end portions of element 21.

Referring again to FIGS. 2 and 3, master element 21 is shown to have a pair of circular collars 29, 29a each mounted on the shaft of element 21 on opposite sides of rectangular collar 22. Each collar 29, 29a is intended to rest atop a vertical pin 30 (FIG. 2) supported by a spring 32 contained within a cylindrical opening 31 in a block portion 33 attached to V block 12. Each of the opposite end portions of master element 21 rests in the space between the diverging arms 34, 35 of a respective V block 12 atop the tail ends of a pair of screws 36 each extending angularly upwardly through a respective one of the diverging arms 34, 35 of the V block. The spring supported pins 30 provide a shock-absorbing mounting for the element 21, and the screws 36 provide a means for vertically adjusting the shaft end portion which they support. More specifically a shaft end portion can be raised or lowered by turning the supporting screws 36 to move inwardly or outwardly respectively. By these adjustments the centers of the opposite shaft end portions can be aligned in the same horizontal plane.

Master reflecting element 21 must be positioned on the V blocks 12 so that an opening 37 extending through element 21 transversely to the axis thereof is located in the path of light rays emanating from collimator tube D. In this position an upper reflecting surface 38 on rectangular collar 22 will lie in the path of a portion of the light ray emanating from collimator tube D, the rest of the light rays passing through opening 37 being reflected by reference mirror 20. The image reflected by collar surface 38 is then compared with the image reflected by reference mirror 20. Assuming the collimator tubes contain one horizontal and one vertical cross hair, if the horizontal cross hair image reflected by surface 38 is above or below the horizontal cross hair image reflected by reference mirror 20, then element 21 must be rotated about its axis until these images merge. If the vertical cross hair image reflected by surface 38 is to the left or to the right of the vertical cross hair image reflected by reference mirror 20, then this means that one of the opposite end portions of element 21 is higher than the other and the adjustable screws 36 must be turned to bring these ends into horizontal alignment. When element 21 has been adjusted so that the image reflected by collar surface 38 merges with the image reflected by reference mirror 20, then the other reflecting surfaces on element 21, that is, surfaces 25, 26, 39, and 40, are situated perpendicular to their corresponding reference axes $C_r$, $B_r$, $A_r$, and $A_r'$. The next step is to then position the corresponding reference mirrors 18 and 19 so that the images reflected thereby merge with the images reflected by the reflecting surfaces on positioned element 21.

Referring to FIG. 7, reference mirror 18 is shown to comprise a base portion 41, an upright portion 42 having a circular opening 43 therein, a shutter or mask element 44 situated against one end of opening 43 and an annular cover plate 45 placed against shutter or mask 44 and holding the latter in its position adjacent opening 43 by means not shown. Shutter 44 comprises a plurality of staggered inwardly extending spokes 46, at the junction of which is a mirror 47 for reflecting light rays emanating from collimator tubes C or B.

Referring to FIG. 8, reference mirror 19 is shown to comprise a base portion 48, an upright portion 49 having an opening 50 therein, a circular shutter or mask 51 positioned adjacent one end of the opening 50 and having a semi-circular opening therein, and an annular cover plate 52 placed against the shutter 51 and holding the latter in place by means not shown. Positioned just below the unshuttered semi-circular portion of opening 50 is a mirror 53 for reflecting light emanating from collimator tubes A or A'.

When reference mirrors 18, 19 are positioned so that the images reflected thereby merge with the images reflected from the corresponding reflecting surfaces on master element 21, thereby indicating alignment of the reference mirrors with their respective reference axes, the master reflecting element 21 is removed from V blocks 12 and the workpiece 14 is substituted therefor.

Referring to FIG. 4, the stub shafts 13 which mount the workpiece 14 in the V blocks 12 each have a flange portion 55 which is attached to a flat surface portion at one end of the workpiece by screws extending through screws holes 56a in the flange portion 55 and through aligned screw holes in the workpiece.

As previously indicated, there is initially placed within each bore 54 of the workpiece 14 an axis locating unit 15 containing a plurality of radially extending blade mirrors 16 (FIG. 5). Locating unit 15 is substantially spool-shaped and comprises a hub portion 56 and flange portions 57, 58 at opposite ends of hub portion 56. Each flange portion has a plurality of radially extending slots 59 therein, each slot receiving a respective blade mirror 16.

Referring to FIGS. 5 and 6, each blade mirror is shown to comprise an elongated portion 65, tapered bore-engaging portions 66, 67 at opposite ends of portion 65, and a portion 69 extending through flange 57 and terminating in a reflecting surface 70. Extending around portion 65 of each blade mirror are upper and lower bands 60, 61, each made of a springable material and each having opposite ends wrapped around and attached to a shaft 62 extending from flange 58 through flange 57 and terminating in a knurled handle 63. Located between each blade mirror elongated portion 65 and the hub portion 56 of unit 15 is a spring 100 normally urging blade mirror 16 radially outwardly. When unit 15 is initially inserted into a bore 54 in the workpiece 14, the knurled handle 63 is turned clockwise to wind the bands therearound and tighten them thereby forcing the blade mirrors radially inwardly against the urging of the springs. Flange portion 58 and hub portion 56 of locating unit 15 are then inserted into the bore, unit 15 is rotated to a predetermined position, and the knurled knob is released. Upon release of the knob the springs 100 urge the blade mirrors 16 outwardly until tapered portions 66, 67 engage the wall of the bore.

When locating unit 15 is initially inserted into bore 54 the former must be rotated within the latter until screw holes 71 in overlapping flange 57 of locating unit 15 are aligned with corresponding screw holes spaced around the periphery of the bore (FIGS. 4 and 5). When the corresponding screw holes are thus aligned and have received connecting screws 73, the locating unit 15 will be positioned within workpiece 14 so that when the latter is mounted on V blocks 12 and rotated about the axis of the shafts 13 to an alignment determining position, the reflecting surfaces 70 on two of the blade mirrors will extend in a horizontal direction and the reflecting surfaces 70 on the other two blade mirrors will extend in a vertical direction in each of the bores corresponding to axes $B_r$ and $C_r$. For the bore corresponding to axis $D_r$, one pair of blade mirrors will extend perpendicularly to the other pair and each pair will be parallel to the image of a cross hair reflected from the reference mirror 20.

The above described dispositions of the reflecting surfaces 70 are based on the assumption that the bore is cylindrical. If the bore is tapered the reflecting surfaces 70 will extend in directions so that the projection of any reflecting surface on a plane parallel to the corresponding reference mirror will extend in the same direction as one of the cross hairs.

It should be noted that the blade mirrors 16 extend radially from the axis of locating unit 15 in a staggered arrangement whereby the clockwise edge of each reflecting surface is in linear alignment with the clockwise edge on an oppositely extending reflecting surface. On the reference mirror units 18 the spokes 46 are staggered so that the counterclockwise edges are similarly aligned (FIG. 7). Consequently, when all the elements are disposed in bore alignment-determining positions a clockwise edge on each reflecting surface 70 will lie almost directly behind a counterclockwise edge on a spoke 46. By virtue of this arrangement none of the light aimed at a reflecting surface 70 is blocked by a spoke 46 because all of surface 70 is disposed behind the opening between a pair of spokes.

The alignments of the workpiece bores are determined in the following manner. An initial sighting is made through collimator D. A portion of the light rays emanating from collimator D will pass through an axial opening 64 in locating unit 16 (FIG. 4) and will be reflected by reference mirror 20 situated below workpiece 14. Other portions of the light ray will be reflected by the reflecting surfaces 70 on the radially extending blade mirrors 16 in the locating unit 15. The image reflected by the reference mirror 20 is compared, in succession, with the image reflected by each surface 70. Assuming the bore to be cylindrical, if the axis thereof is aligned properly it will be perpendicular to the reflecting surface on mirror 20 and hence reflecting surfaces 70 on the blade mirrors 16 will be parallel to the reflecting surface on mirror 20, resulting in a merging of the images from the reflecting surfaces with the image from the reference mirror 20. If the horizontal cross hair images from the reflecting surfaces are above or below the corresponding image from the reference mirror, it may be possible to bring the images into merging relation by rotating the workpiece about its axis. If rotation of the workpiece about its axis fails to bring the images into merging relation, this means that the bore is disaligned and the workpiece must be discarded.

Assuming that an alignment of the images from the reference mirror and from the blade mirror has been achieved, the next step is to test the alignment of the bores opposite collimators B and C. The procedure for doing this is the same in each case. The image reflected from reference mirror unit 18 is compared, in succession, with the image reflected from the reflecting surface of each of the blade mirrors in the corresponding locating unit 15 and if the images do not merge the axis of the bore is not aligned with the reference axis. If the vertical cross hair images are not aligned, this means that the bore axis does not lie in the same vertical plane as the horizontal reference axis. If the horizontal cross hair images are not aligned, this means that the bore axis does not lie in the same horizontal plane as the horizontal reference axis.

As previously indicated, the locating units 15 in the bores opposite collimators C and D are mounted so that two of the radially extending blade mirrors are disposed on opposite sides of the bore axis and two other radially extending mirrors are likewise disposed on opposite sides of the bore axis at a 90 degree disposition to the first two oppositely disposed blade mirrors. Other positions of reference for the blade mirrors could be used and a different number of blade mirrors could also be used. However, the use of four blade mirrors extending in the directions indicated has been found to be most convenient and most simple for determination purposes.

If the bores are tapered the images reflected by the blade mirrors will not merge entirely with the images reflected by the reference mirrors. More specifically, the vertical images from each of the horizontally disposed reference mirrors will straddle the vertical image from the reference mirror. By the same token, the horizontal images from the blade mirrors will straddle the horizontal image reflected by the reference mirror. This is because when the bores are tapered the reflecting surfaces on the blade mirrors are not coplanar but are inclined to each other. In other words the reflecting surfaces are so situated with respect to the bore axis that the projection of a reflecting surface on a plane perpendicular to the bore axis has a transverse dimension perpendicular to its radical dimension which transverse dimension is equal to the transverse dimension on the reflecting surface itself, and a radial dimension less than the radial dimension on the reflecting surface.

In this situation proper alignment of the bore axis is indicated when the images from the opposite reference mirrors are exactly bisected by the corresponding image from the reference mirror. More specifically, the vertical image from the reference mirror would be exactly in the center of the vertical images from the two horizontally extending blade mirrors. Finally, the alignment of the axis of the workpiece extending through stub shafts 13 is determined by comparing the image reflected from reference mirror 19 with an image reflected from polished end faces 73 on the stub shafts (FIG. 4).

Although the apparatus described and illustrated has been shown in conjunction with a particular type of workpiece, it is to be understood that the structure shown in the drawings can be used with other types of workpieces to determine the axial alignment of a bore therein. Furthermore, the apparatus shown in the drawings and described in the specification is merely illustrative of one of the many forms which the invention may take in practice without departing from the scope of the invention as recited in the appended claims.

I claim:

1. An apparatus for determining the alignment of the axis of a bore in a workpiece relative to a predetermined reference axis, said apparatus comprising a tubular viewing scope the axis of which defines the said reference axis, alignment hairs within said scope, a light source behind said alignment hairs, optical means in said scope for refracting the light from said light source and projecting parallel light rays, a reference mirror located in the path of said light rays and situated to reflect an image of said alignment hairs, the reflecting surface of said reference mirror being perpendicular to said reference axis for reflecting the image of the alignment hairs into the said viewing scope, means locating said bore in the path of said light rays, a plurality of blade mirrors, and means mounting each of said blade mirrors in a predetermined position within said bore to reflect an image of said alignment hairs into the said viewing scope for comparison with the image reflected by the reference mirror, each of said blade mirrors when in its predetermined position having a reflecting surface extending radially between the axis and side wall of the bore.

2. An apparatus as recited in claim 1, wherein the alignment hairs of said tubular viewing scope are mutually perpendicular cross hairs and wherein a special projection of said reflecting surface of one of said blade mirrors projected on a plane parallel to said reference mirror extends in the same direction as one of said cross hairs projected on the same plane, and a spacial projection of the reflecting surface of another of said blade mirrors projecting on said same plane extends in the same direction as the other of said cross hairs projected on the same plane.

3. An apparatus as recited in claim 1, wherein said blade mirror mounting means comprises a spool-shaped element, a plurality of radially extending slots in said spool-shaped element each for receiving a respective one of said blade mirrors, and means normally urging said received blade mirrors radially outwardly in said slots.

4. An apparatus as recited in claim 3, wherein said spool-shaped element has a hub portion and two flange portions each at respective opposite ends of said hub portion, the dimensions of one of said flange portions and of said hub portion being small enough for insertion of said one flange portion and said hub portion into said bore.

5. An apparatus as recited in claim 4, wherein the alignment hairs of said tubular viewing scope are mutually perpendicular cross hairs, the other of said spool flange portions overlaps the open end of said bore, and wherein the apparatus further comprises means on said overlapping flange portion for attaching the inserted spool-shaped element to said workpiece in a position in which the spacial projection of the reflecting surface of one of said received blade mirrors projected on a plane parallel to said reference mirror extends in the same direction as one of said cross hairs projected on the same plane, and the spacial projection of the reflecting surface of another of said blade mirrors projected on said same plane extends in the same direction as the other of said cross hairs projected on the same plane.

6. An apparatus as recited in claim 5, wherein each of said received blade mirrors has an elongated portion extending in substantially the same direction as the hub portion of the spool-shaped element and bore-engaging portions at each end of said elongated portion.

7. An apparatus as recited in claim 3, wherein said spool-shaped element has an opening extending axially therethrough, said reference mirror being substantially in alignment wtih said opening.

8. A device adapted for insertion into the bore of a workpiece for determining the alignment of the bore's axis relative to a predetermined reference axis perpendicular to the reflecting surface of a reference mirror, said device comprising a substantially cylindrical element insertable within said bore, a plurality of blade mirrors, a plurality of radially extending slots in said element each receiving a respective one of said blade mirrors, and means normally urging said blade mirrors radially outwardly into engagement with the inner wall surface of said bore, wherein each of said blade mirrors has a reflecting surface extending between the axis and the wall of the bore.

9. A device as recited in claim 8, wherein said cylindrical element has an opening extending axially therethrough, said opening being in alignment with said reference mirror.

10. A device adapted for insertion into the bore of a workpiece for determining the alignment of the bore's axis relative to a predetermined reference axis perpenricular to the reflecting surface of a reference mirror, said device comprising a substantially cylindrical element insertable within said bore, mirror means, and slot means in said element receiving the said mirror means, wherein a reflecting surface of the said mirror means extends between the axis and the wall of the bore.

References Cited by the Examiner

UNITED STATES PATENTS

| 2,010,301 | 8/35 | Helfer | 88—74 X |
| 2,546,524 | 3/51 | Schipplock | 88—14 X |
| 2,563,780 | 8/51 | Fontaine | 88—14 |
| 2,577,807 | 12/51 | Pryor | 88—14 X |
| 2,849,911 | 8/58 | Brunson | 88—14 |
| 2,975,522 | 3/61 | Postel | 88—14 X |

FOREIGN PATENTS 240,426　11/25　Great Britain.

JEWELL H. PEDERSEN, *Primary Examiner.*

WILLIAM MISIEK, *Examiner.*